(12) United States Patent
Mori et al.

(10) Patent No.: US 6,272,851 B1
(45) Date of Patent: Aug. 14, 2001

(54) EXHAUST RECIRCULATION SYSTEM OF INTERNAL COMBUSTION ENGINE

(75) Inventors: Kouji Mori; Yutaka Matayoshi, both of Yokosuka; Yasushi Noda, Yokohama, all of (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/448,430

(22) Filed: Nov. 24, 1999

(30) Foreign Application Priority Data

Nov. 27, 1998 (JP) ................................... 10-336420

(51) Int. Cl.$^7$ .................................................. F02M 25/06
(52) U.S. Cl. .............................. 60/278; 60/279; 60/605.2; 123/568.17; 123/184.24
(58) Field of Search .......................... 60/278, 279, 605.2; 123/568.17, 568.15, 184.24, 184.34, 184.42, 184.47

(56) References Cited

U.S. PATENT DOCUMENTS

| | | | |
|---|---|---|---|
| 3,890,945 | * 6/1975 | Goto et al. | 123/119 A |
| 4,393,863 | * 7/1983 | Groves | 123/568 |
| 4,461,150 | * 7/1984 | Grohn | 60/605 |
| 4,640,256 | 2/1987 | Conrad et al. | |
| 4,693,226 | * 9/1987 | Choma | 123/568 |
| 5,533,487 | * 7/1996 | Cailey | 123/568 |
| 5,572,979 | * 11/1996 | Czadzeck | 123/568 |
| 5,823,160 | * 10/1998 | Oda et al. | 123/295 |
| 5,957,116 | * 9/1999 | Haegele et al. | 123/568.12 |

FOREIGN PATENT DOCUMENTS

| | | |
|---|---|---|
| 31 06 588 | 9/1982 | (DE) . |
| 33 24 343 | 7/1984 | (DE) . |
| 35 11 094 | 10/1986 | (DE) . |
| 0 857 870 | 8/1998 | (EP) . |
| 3-114563 | 11/1991 | (JP) . |
| 3-114564 | 11/1991 | (JP) . |
| 5-106519 | 4/1993 | (JP) . |

OTHER PUBLICATIONS

Patent Abstracts of Japan, vol. 017, No. 671 (M–1525), Dec. 10, 1993 & JP 05 223016 A (Toyota Motor Corp), Aug. 31, 1993 (Abstract).

Patent Abstracts of Japan, vol. 1998, No. 08, Jun. 30, 1998 & JP 10 077913 A (Aisin Seiki Co. Ltd.), Mar. 24, 1998 (Abstract).

* cited by examiner

*Primary Examiner*—Thomas Denion
*Assistant Examiner*—Binh Tran
(74) *Attorney, Agent, or Firm*—Foley & Lardner

(57) ABSTRACT

This invention relates to an exhaust recirculation system for a multi-cylinder internal combustion engine (1), wherein intake air aspirated to a collector (4) from an intake passage (6) of circular cross-section is provided to cylinders (#1–#4) via branch pipes (5A–5D) connected the collector (4). The exhaust gas recirculation system is provided with an exhaust gas recirculation pipe (7) which branches off from an exhaust passage (3) and connected to the intake passage (6), and an exhaust gas inlet (8, 9) which leads a recirculated exhaust gas of the exhaust recirculation pipe (7) into the intake passage (6) along a tangent line of the circular cross-section of the intake passage (6).

18 Claims, 9 Drawing Sheets

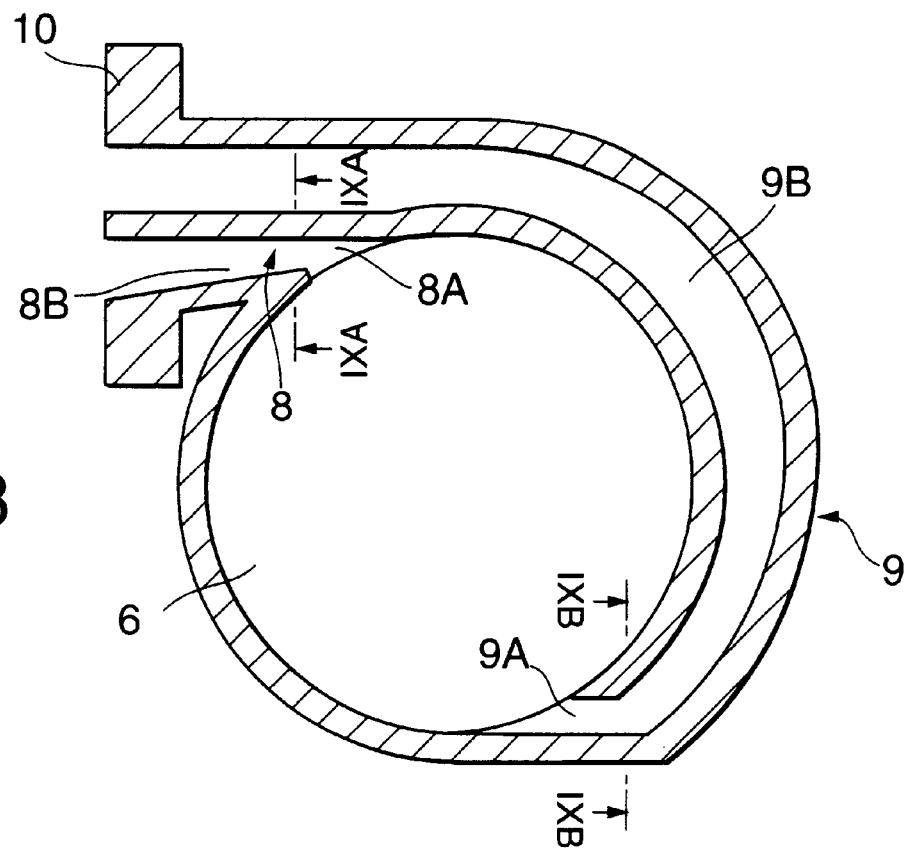
FIG. 8
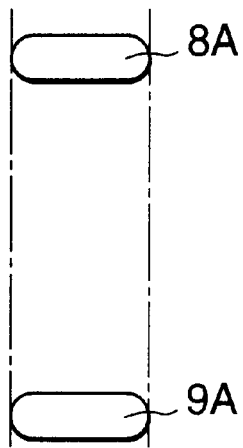
FIG. 9A
FIG. 9B

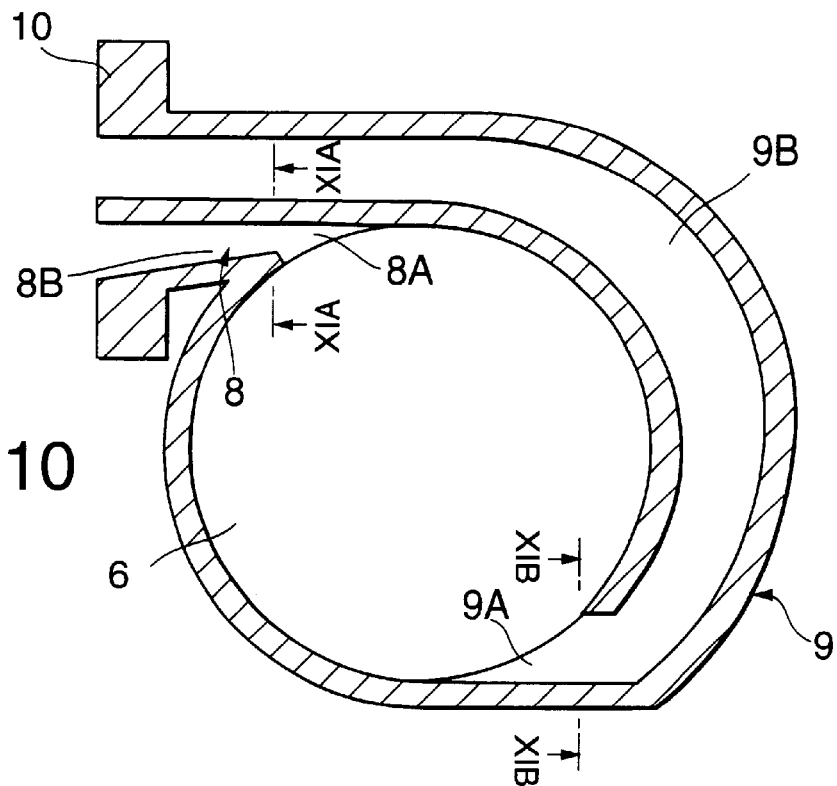
FIG. 10
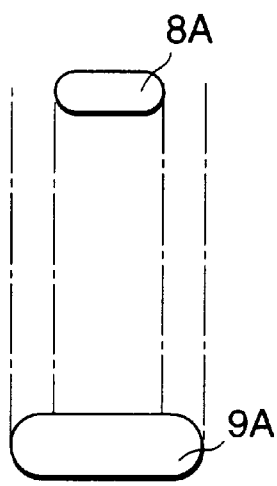
FIG. 11A
FIG. 11B

EXHAUST RECIRCULATION SYSTEM OF INTERNAL COMBUSTION ENGINE

FIELD OF THE INVENTION

This invention relates to an exhaust recirculation system in an internal combustion engine such as a diesel engine of an automobile.

BACKGROUND OF THE INVENTION

In regard to an exhaust recirculation system (EGR system) wherein a part of the exhaust is recirculated into the intake air to perform combustion control of an internal combustion engine, various devices have been proposed to promote mixing of intake air and recirculated exhaust gas.

Jikkai Hei 3-114563 published by the Japanese Patent Office in 1991 discloses a system wherein an insulator is gripped between a throttle case and surge tank in the intake passage of the engine, a pair of exhaust inlets are provided at an 180-degree interval in the insulator towards the center of the intake passage, and exhaust gas is mixed with intake air through these exhaust gas inlets.

Jikkai Hei 3-114564 published in 1991 by the Japanese Patent Office discloses a device wherein an annular passage for leading exhaust gas surrounds the intake passage, and exhaust gas is led into the intake air via plural holes connecting the annular passage and intake passage.

Tokkai Hei 5-106519 published by the Japanese Patent Office in 1993 discloses a system wherein a minute throughhole connecting an exhaust port and intake port of an engine.

Further, this prior art discloses that the air-fuel mixture of fuel injected into the intake port and intake air is heated by the exhaust gas led to the intake port, and a swirl promoted by the throughhole arranged on a tangential line of the cross-section of the inlet port accelerates evaporation of the fuel adhering to the wall of the inlet port.

SUMMARY OF THE INVENTION

When exhaust gas is introduced from a right-angled direction as in Jikkai Hei 3-114563 and Jikkai Hei 3-114564 towards the center of the intake passage of a multi-cylinder engine, the exhaust gas forms an uneven flow in the passage due to the flow of intake air in the intake passage, and this causes unevenness in the exhaust concentration in each part of the cross-section of the passage. As a result, the exhaust gas concentration in the intake air will vary greatly depending on the cylinder. In general, in diesel engines which do not have a throttle, the flow of intake air is close to laminar flow, so this phenomenon is very pronounced, and as a result, a difference easily arises in the exhaust recirculation rate depending on the cylinder.

On the other hand, when the exhaust gas is supplied to the intake air through a minute throughhole formed in the cylinder head as in Tokkai Hei 5-106519, the exhaust recirculation rate is limited, and as the exhaust gas is mixed with the intake air just before the combustion chamber, the exhaust gas and intake air are aspirated into the combustion chamber without being properly mixed, and a variation in the running conditions of the engine has a direct effect on the exhaust recirculation rate (EGR rate). Such characteristics may makes the EGR rate of the engine unstable.

It is therefore an object of this invention to make the EGR rate of each cylinder of a multi-cylinder engine uniform, while preventing the variation of the running conditions of the engine from affecting the EGR rate.

In order to achieve the above object, this invention provides a exhaust recirculation system for a multi-cylinder internal combustion engine, wherein intake air aspirated to a collector from an intake passage of circular cross-section is provided to cylinders via branch pipes connected to the collector, and part of exhaust gas of the engine is recirculated to the intake passage from an exhaust passage. The exhaust recirculation system comprises an exhaust recirculation pipe which branches off from the exhaust passage and is connected to the intake passage, and an exhaust gas inlet which leads a recirculated exhaust gas of the exhaust recirculation pipe into the intake passage along a tangent line of the circular cross-section of the intake passage.

The details as well as other features and advantages of this invention are set forth in the remainder of the specification and are shown in the accompanying drawings.

BRIEF DESCRIPTION OF THE DRAWINGS

FIG. 8 is similar to FIG. 7, but showing a fourth embodiment of this invention.

FIGS. 9A and 9B are cross-sectional views of exhaust gas inlets taken along lines IXA—IXA and IXB—IXB of FIG. 8.

FIG. 10 is similar to FIG. 7, but showing a fifth embodiment of this invention.

FIGS. 11A and 11B are cross-sectional views of exhaust gas inlets taken along lines XIA—XIA and XIB—XIB of FIG. 11.

DESCRIPTION OF THE PREFERRED EMBODIMENTS

Figure 1:
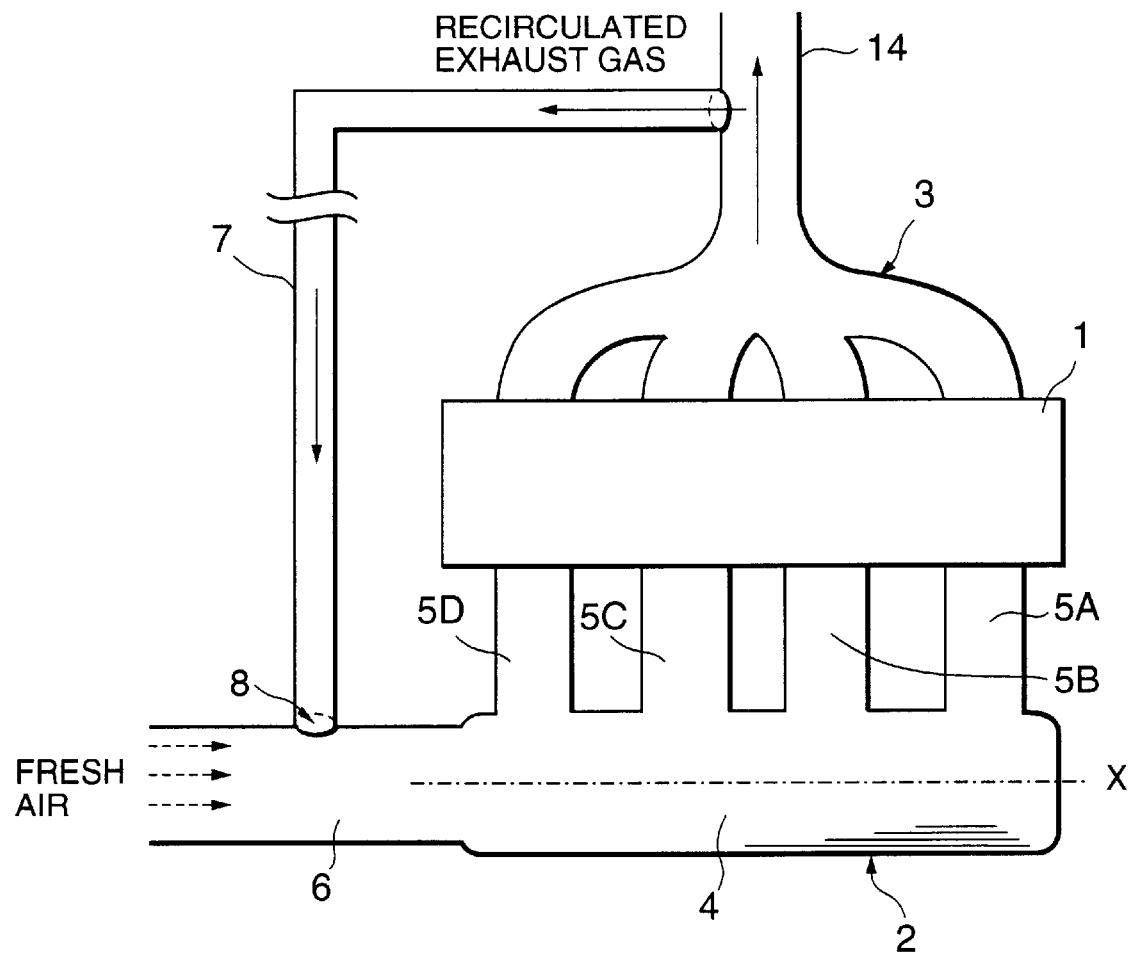
FIG. 1 is a schematic diagram of an exhaust recirculation system according to this invention.

Referring to FIG. 1 of the drawings, an intake manifold 2 is installed on one side of a four-cylinder diesel engine 1, and an exhaust manifold 3 is installed on the other side. The intake manifold 2 comprises a collector 4 extending in the direction of the row of cylinders of the engine, and branch pipes 5A–5D which connect the collector 4 with cylinders #1 to #4 of the engine. The collector 4 has a longitudinal axis X as shown in the figure and the branch pipes 5A–5D are connected to the collector 4 from a direction perpendicular to the longitudinal axis X.

An intake passage 6 is connected to one end of the collector 4 from a direction corresponding to the longitudinal axis X. Fresh air is introduced into the intake passage 6 through an air cleaner, not shown in the figure.

An exhaust recirculation pipe 7 is connected to the intake passage 6 at right-angles to the intake passage 6 via an exhaust gas inlet 8. The exhaust recirculation pipe 7 branches from an exhaust passage 14 connected to the exhaust manifold 3, and recirculates part of the exhaust gas of the engine 1 to the intake passage 6. An exhaust recirculation control valve or the like, not shown in FIG. 1, is installed in the exhaust recirculation pipe 7.

Figure 2:
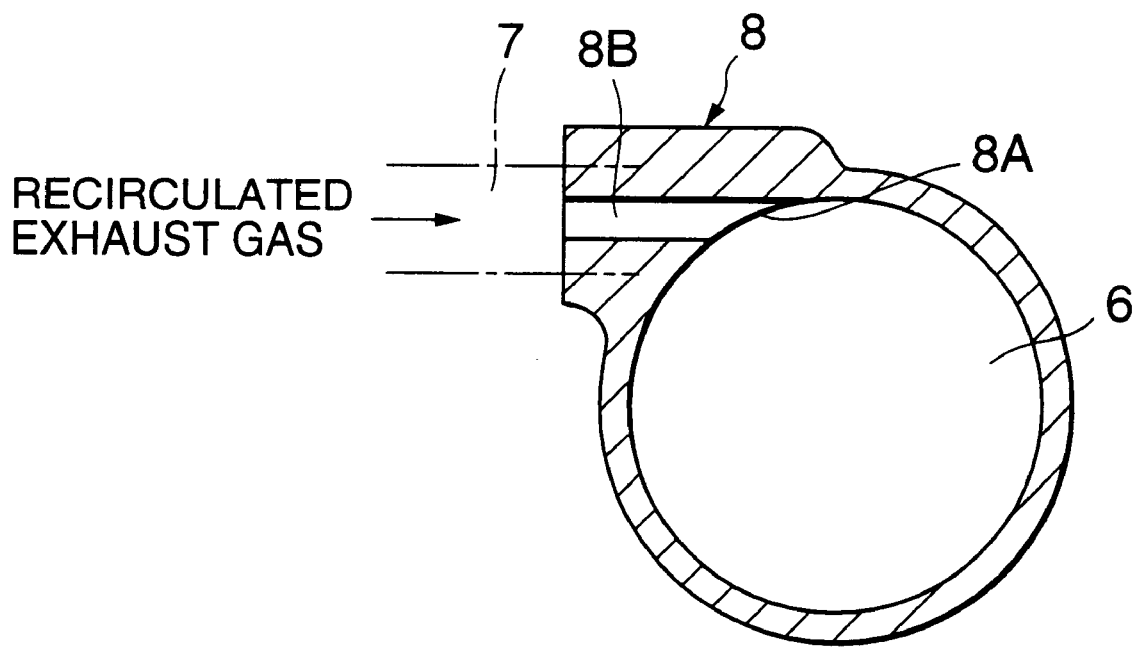
FIG. 2 is a cross-sectional view of an intake passage according to this invention showing a construction of an exhaust gas inlet.
Figure 4:
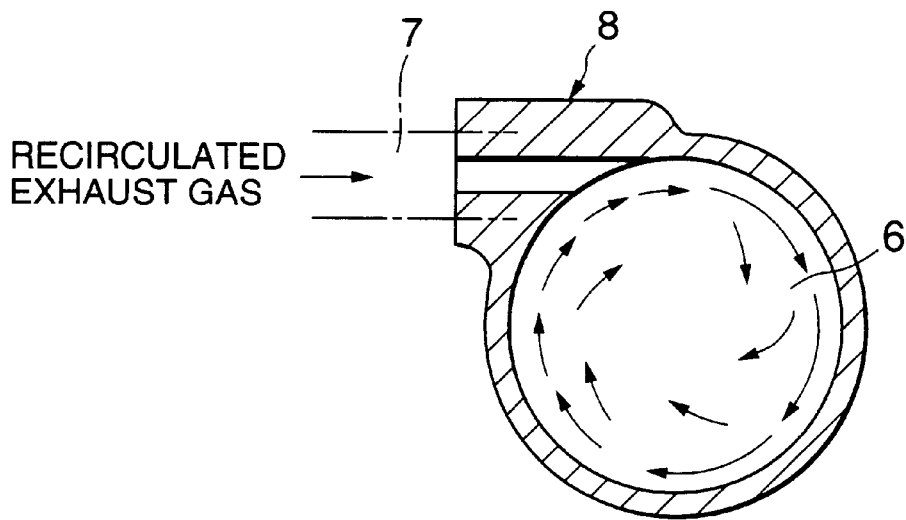
FIG. 4 is a cross-sectional view of the intake passage taken at the exhaust gas inlet for the purpose of describing a flow of exhaust gas led into the intake passage.

Next, referring to FIG. 2, the exhaust gas inlet 8 comprises an exhaust gas conduit 8B and an opening 8A located on a tangent line of a circular cross-section of the intake passage 6. Due to the construction of this exhaust gas inlet 8, recirculated exhaust gas flowing from the exhaust recirculation pipe 7 into the intake passage 6 sets up a flow along the cylindrical wall of the intake passage 6 as shown in FIG. 4.

The intake passage 6 comprises a pipe of circular cross-section of molded aluminum alloy. The exhaust gas inlet 8 is precast as a boss together with the pipe, and the exhaust recirculation pipe 7 comprising a metal pipe is connected to this boss.

In FIG. 2, the exhaust gas inlet 8 and the branch pipes 5A–5D are located on the same side of the intake passage 6, but the location of the exhaust gas inlet 8 relative to the intake passage 6 is not limited to this and the angle between the exhaust gas inlet 8 and the branch pipes 5A–5D may be freely set.

Figure 3:
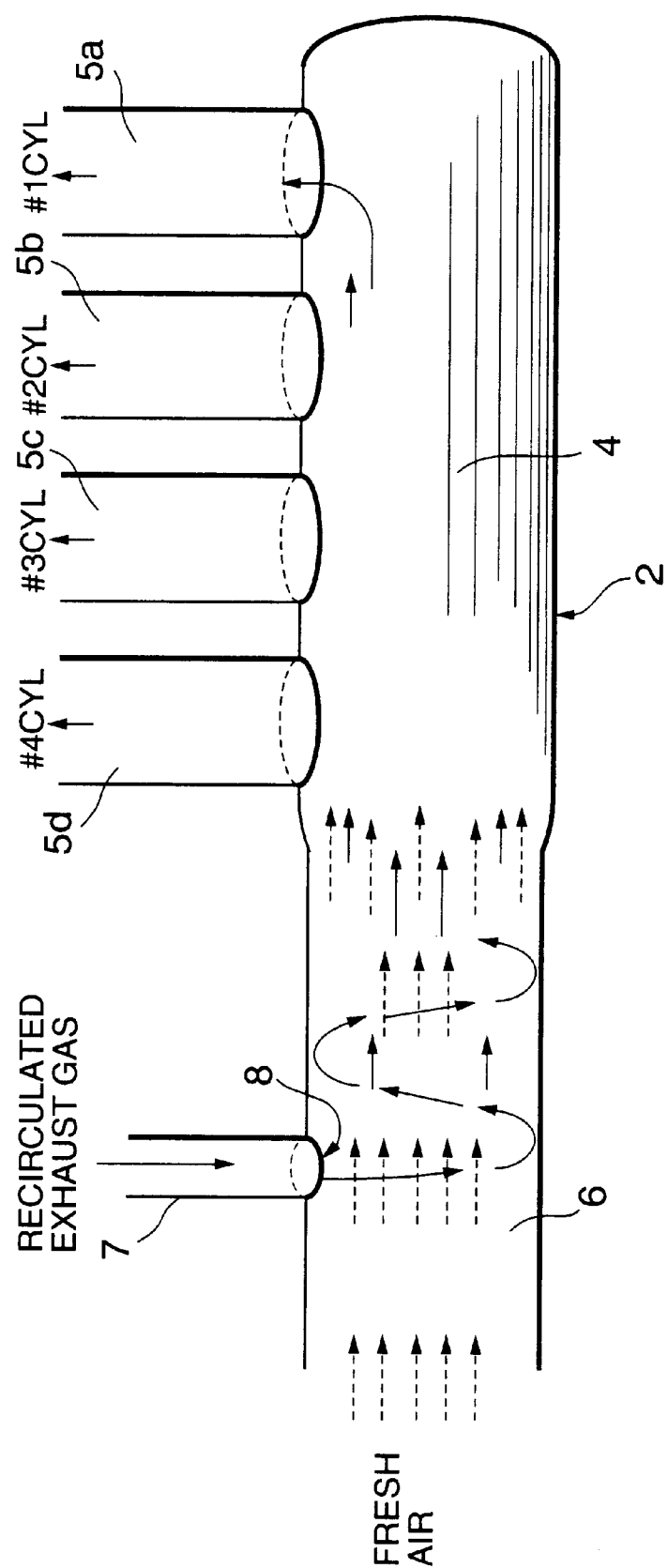
FIG. 3 is a schematic perspective view of a collector and the intake passage according to this invention describing the flow of intake air and exhaust gas.

Next, referring to FIG. 3, fresh air aspirated through the intake passage 6 sets up a laminar flow as shown by arrows with broken lines.

The recirculated exhaust gas flowing into the intake passage 6 from the exhaust gas inlet 8 forms a swirl along the cylindrical wall surface of the intake passage 6, as shown by arrows with solid lines in FIGS. 3 and 4. Due to the effect of the flow of fresh air, this swirl sets up a spiral flow towards the collector 4, and due to the dispersion of the recirculated exhaust gas toward the inside, it mixes with the fresh air flowing inside the spiral. On the other hand, as the direction of the spiral flow is effectively perpendicular to the flow of fresh air, turbulence is set up at the boundary between the fresh air and the recirculated exhaust gas. The energy of this turbulence promotes mixing of the fresh air and the recirculated exhaust gas.

Figure 5:
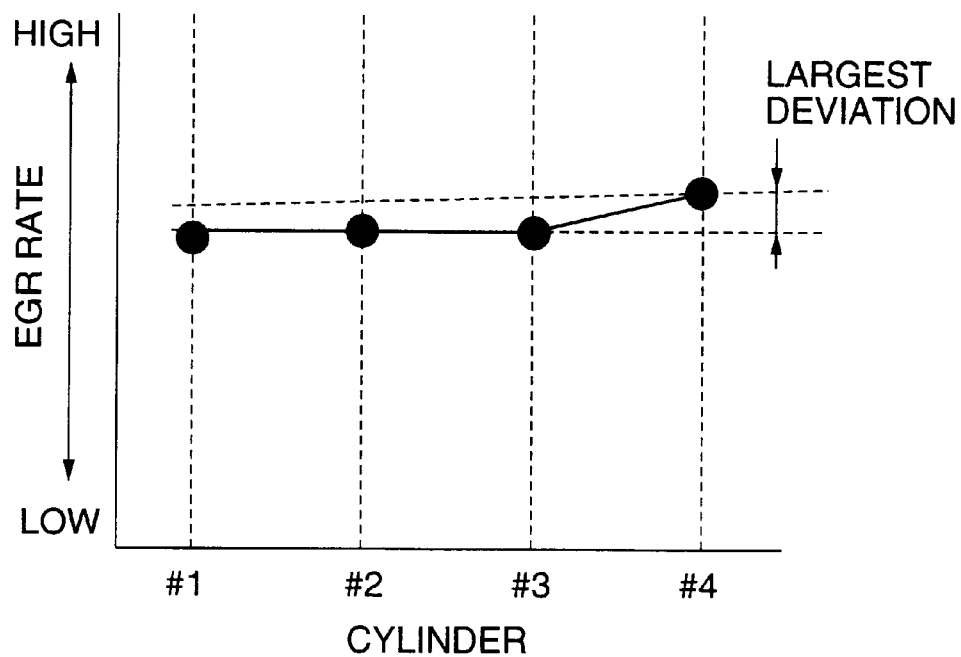
FIG. 5 is a diagram showing an EGR rate in each cylinder of an engine with the exhaust recirculation system according to this invention.

Thus, the exhaust concentration of the intake air flowing into the collector 4 is made more uniform by the spiral flow due to the exhaust gas inlet 8 which promotes mixing of the fresh air and recirculated exhaust gas, and deviation of the EGR rate in the cylinders #1–#4 become small as shown in FIG. 5. Moreover, due to the mixing of recirculated exhaust gas and fresh air upstream of the collector 4, the exhaust recirculation rate is not easily influenced by the running conditions of the engine 1.

Figure 6:
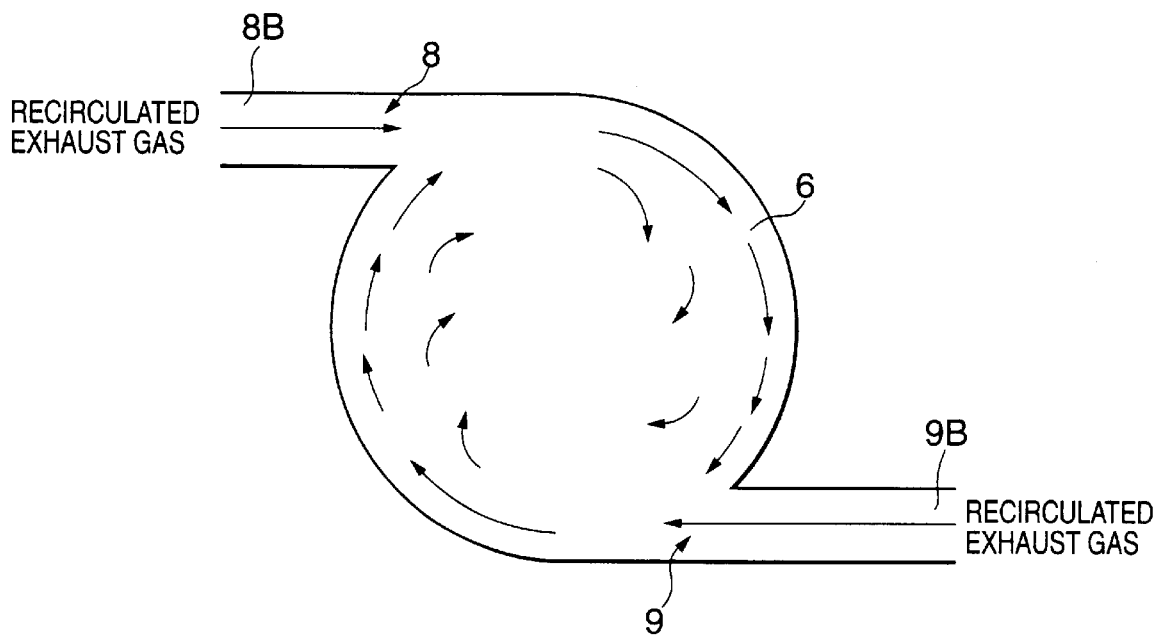
FIG. 6 is a schematic cross-sectional view of an intake passage with a pair of exhaust gas inlets according to a second embodiment of this invention.

FIG. 6 shows a second embodiment of this invention.

In this embodiment, two exhaust gas inlets 8 and 9 are provided on the outer circumference of the intake passage 6 at a 180-degree interval.

The exhaust gas inlets 8 and 9 are arranged so as to set up a swirl in the same direction. The exhaust gas inlet 8 comprises an exhaust gas conduit 8B and opening 8A. the exhaust gas inlet 9 comprises an exhaust gas conduit 9B and opening 9A. The exhaust gas conduits 8B and 9B are respectively connected to the exhaust recirculation pipe 7. The exhaust gas inlets 8 and 9 are formed on the same cross-section of the intake passage 6 as shown in FIG. 6, but they may be slightly offset from each other in the direction of the fresh air flow in the intake passage 6. According to this embodiment, exhaust gas flows into the intake passage 6 from two positions respectively in tangential directions, so the swirl of recirculated exhaust gas is enhanced.

Figure 7:
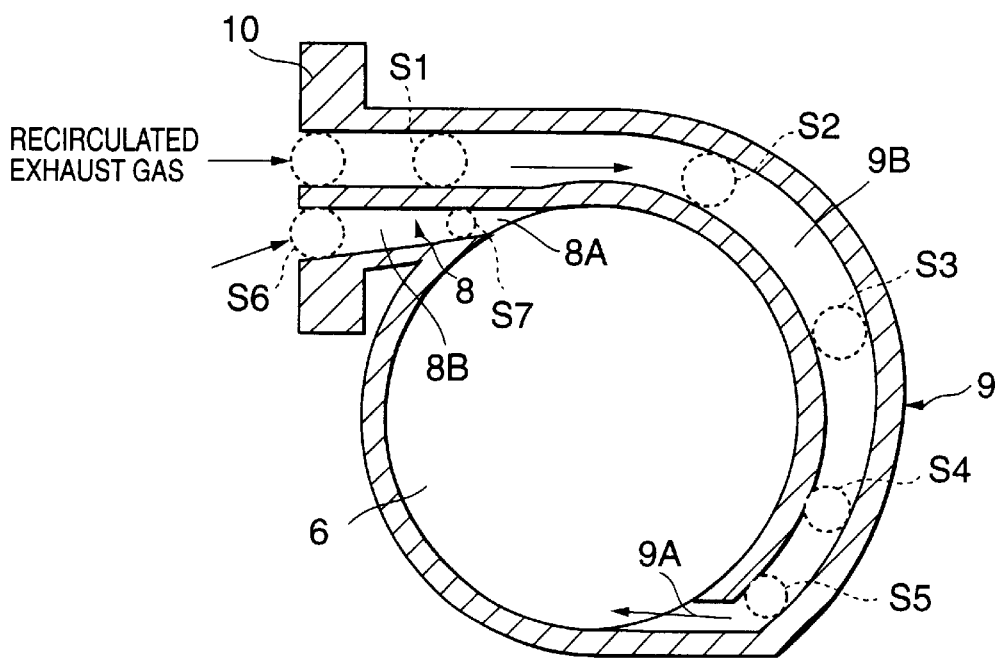
FIG. 7 is a cross-sectional view of an intake passage with exhaust gas inlets according to a third embodiment of this invention.

FIG. 7 shows a third embodiment of this invention.

This embodiment provides two exhaust gas inlets 8 and 9 in the intake passage 6 as in the second embodiment.

The exhaust gas conduits 8B and 9B are precast as a part of the exhaust gas inlets 8 and 9 together with the intake passage 6.

The exhaust gas conduit 8B leading to the opening 8A has a short straight conduit, but the exhaust gas conduit 9B leading to the opening 9A forms a long circular arc along the outer circumference of the intake passage 6. The exhaust gas conduits 8B, 9B are connected to the exhaust recirculation pipe 7 via a common flange 10 which is also precast as a part of the exhaust gas inlets 8 and 9.

The cross-sectional area of the exhaust gas conduit 9B gradually decreases as it approaches the opening 9A as shown by S1–S5 in the figure. The cross-sectional area of the exhaust gas conduit 8B also gradually decreases as it approaches the opening 8A as shown by S6 and S7 in the figure.

This arrangement of the exhaust gas conduits 8B, 9B has the following effect. The long, arc-shaped exhaust gas conduit 9B has a supercharging effect due to the inertial force of the exhaust gas flowing inside it. In addition, as the cross-sectional areas of the exhaust gas conduits 8B and 9B respectively decrease toward the openings 8A and 9A, the speed of the exhaust gas flowing into the intake passage 6 increases, and the exhaust gas is therefore mixed sufficiently with fresh air even at a low exhaust recirculation rate.

FIGS. 8, 9A and 9B show a fourth embodiment of this invention.

This embodiment provides exhaust gas conduits 8B and 9B which are also disposed around the intake passage 6 as in the case of the above-mentioned third embodiment, but have different cross sections. The openings 8A, 9A of the exhaust gas inlets 8, 9 are formed in an elliptical shape with identical dimensions as shown in FIGS. 8A and 9A. The long axis of the ellipse is set parallel to the direction of fresh air flow of the intake passage. The cross-sections of the exhaust gas conduits 8B and 9B accordingly have an elliptical shape, and respectively decrease as they approach the openings 8A and 9A as in the third embodiment.

According to this embodiment, the thickness of the swirl set up by the recirculated exhaust gas flowing into the intake passage 6 is thinner. Therefore, the flow of recirculated exhaust gas flowing into the intake passage 6 is not swept away easily by the flow of fresh air of the intake passage 6, and a swirl is more firmly established along the cylindrical walls of the intake passage 6.

FIGS. 10, 11A and 11B show a fifth embodiment of this invention.

This embodiment differs from the above-mentioned fourth embodiment in that the opening 9A of the exhaust gas inlet 9 is set larger than the opening 8A of the exhaust gas inlet 8. Accordingly, the cross sectional area of the exhaust gas conduit 9B is set to be larger than that of the exhaust gas conduit 8B.

The exhaust gas conduit 9B is longer than the exhaust gas conduit 8B, so by setting the opening 9A to be larger than opening 8A in this manner, the flowrate ratio of the exhaust gas conduits 8B, 9B become almost equal, which creates a desirable environment for setting up a swirl.

Figure 12:
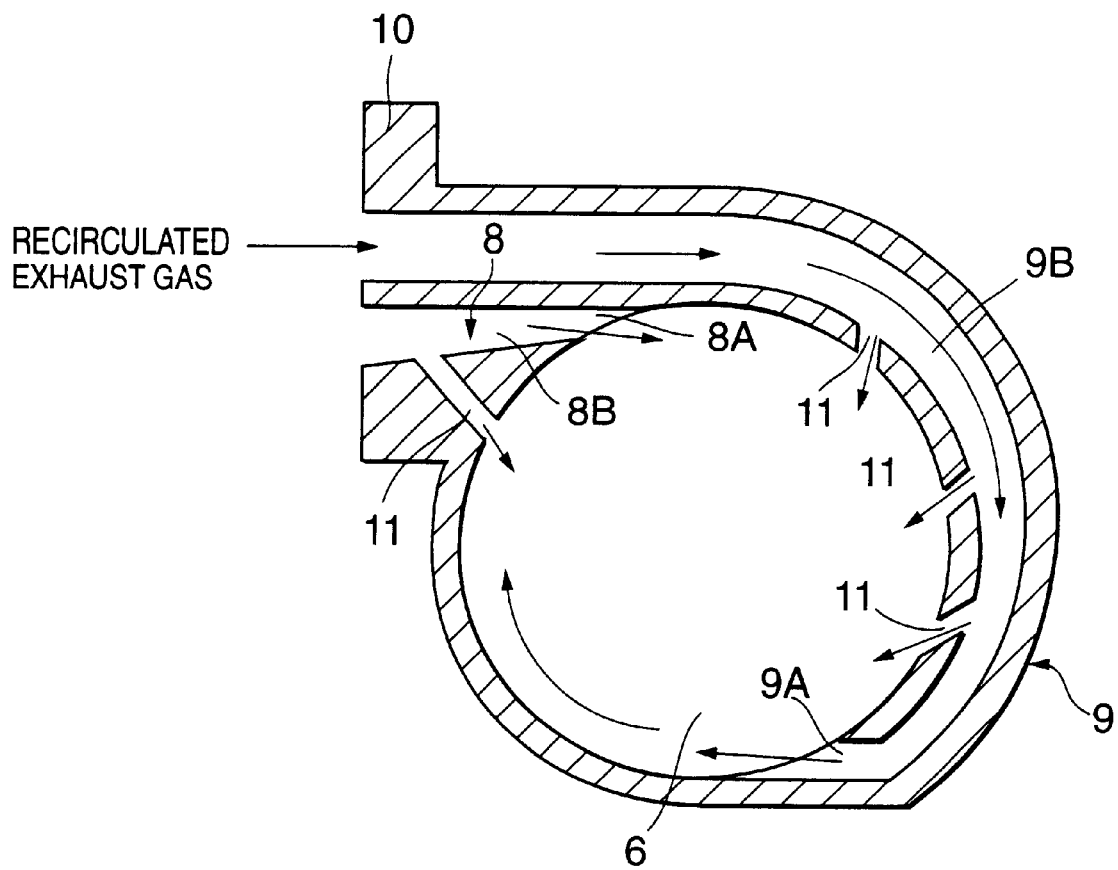
FIG. 12 is similar to FIG. 7, but showing a sixth embodiment of this invention.

FIG. 12 shows a sixth embodiment of this invention.

According to this embodiment, throughholes 11 are formed in the cylindrical wall of the intake passage 6 to connect the exhaust gas conduits 8B, 9B and the intake passage 6.

A part of the recirculated exhaust gas of the exhaust gas conduits 8B, 9B flows into the intake passage 6 through these throughholes 11, so turbulence in the intake passage 6 is promoted, and mixing of exhaust gas with fresh air is promoted. Moreover, since the exhaust gas flows in from various points on the cylindrical wall of the intake passage 6, the concentration of the exhaust gas in the intake passage 6 is made uniform.

Figure 13:
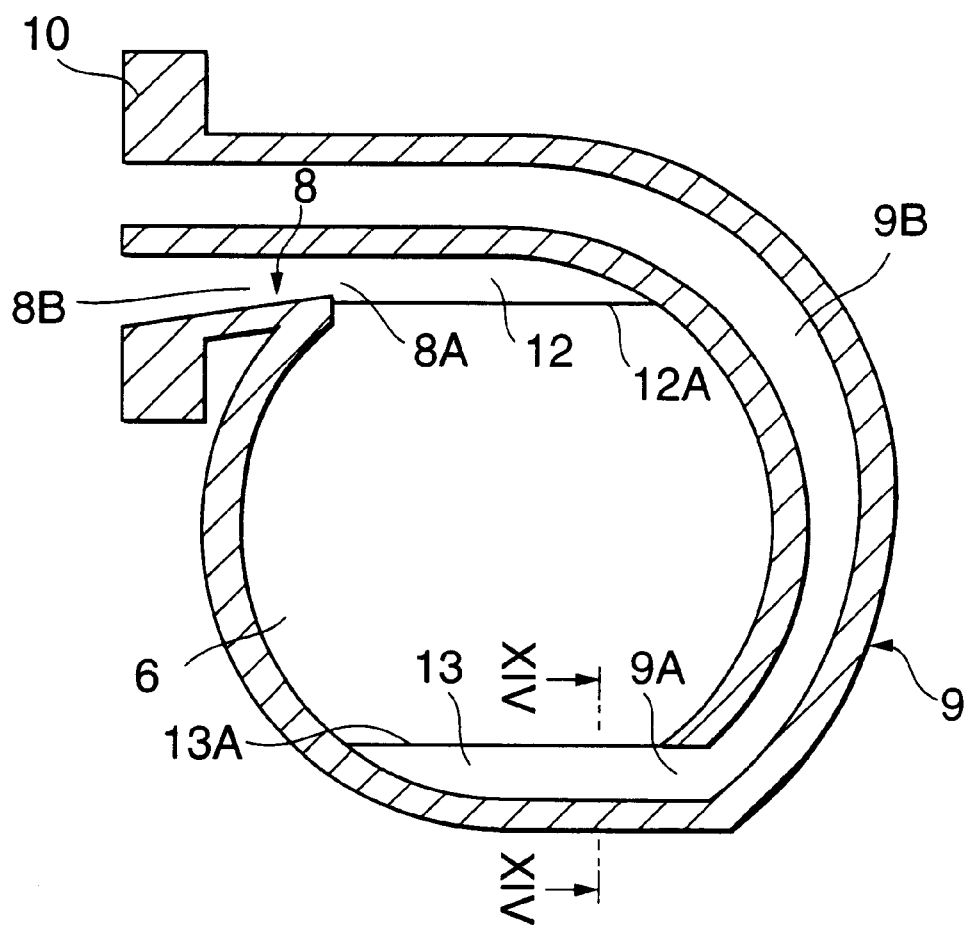
FIG. 13 is similar to FIG. 7, but showing a seventh embodiment of this invention.
Figure 14:
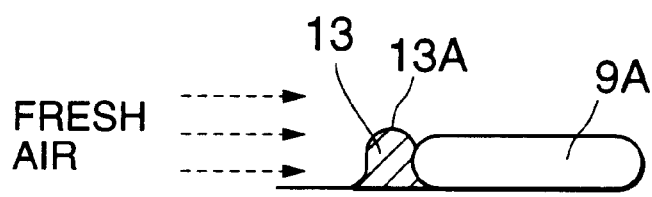
FIG. 14 is a cross-sectional view of an exhaust gas inlet and a rib taken along a line XIV—XIV of FIG. 13.

FIGS. 13 and 14 show a seventh embodiment of this invention. In this embodiment, ribs 12, 13 are provided immediately upstream of the openings 8A, 9A in the intake passage 6. The ribs 12 and 13 respectively project from the inner wall of the intake passage 6 into the intake passage 6 like a weir which is perpendicular to the flow of fresh air of the intake passage 6. Crests 12A and 13A of the weir are on a straight line of the same height as the openings 8A, 9A. In other words, the ribs 12, 13 have a crescent shape, and the maximum value of the height from the inner circumference of the intake passage 6 to the crests 12A and 13A is equal to the length of the short axis of the elliptically-shaped cross-sections of the openings 8A, 9A.

The ribs 12, 13 thus arranged prevent the flow of intake air shown by arrows with broken lines in FIG. 14 from colliding with the recirculated exhaust gas flowing into the intake passage 6 from the exhaust gas inlets 8 and 9. As a result, the recirculated exhaust gas which flows into the intake passage 6 is not easily swept out by fresh air, and the swirl flow along the cylindrical walls of the intake passage 6 is set up more easily.

The contents of Tokugan Hei 10-336420, with a filing date of Nov. 27, 1999 in Japan, are hereby incorporated by reference.

Although the invention has been described above by reference to certain embodiments of the invention, the invention is not limited to the embodiments described above. Modifications and variations of the embodiments described above will occur to those skilled in the art, in light of the above teachings.

The embodiments of this invention in which an exclusive property or privilege is claimed are defined as follows:

What is claimed is:

1. An exhaust recirculation system for a multi-cylinder internal combustion engine, wherein air aspirated to a collector from an intake passage of circular cross-section is supplied to cylinders via branch pipes connected to the collector, and a portion of exhaust gas produced by the engine is recirculated to the intake passage from an exhaust passage, comprising:

an exhaust recirculation pipe which branches off the exhaust passage and is connected to the intake passage; and an exhaust gas inlet which leads recirculated exhaust gas from the exhaust recirculation pipe tangentially into the intake passage with respect to the circular cross-section of the intake passage such that the exhaust gas swirls along an inner peripheral surface of the intake pipe and merges into the air which is flowing axially along the intake passage;

wherein the exhaust gas inlet comprises a first and second inlets which are arranged adjacent one another, which are mutually independent and guide exhaust gas therethrough and via first and second openings, respectively, and which both eject exhaust gas tangentially into the intake passage.

2. An exhaust gas recirculation system as defined in claim 1, wherein the intake passage of the engine is unthrottled.

3. An exhaust gas recirculation system as defined in claim 1, wherein the intake passage aspirates air in a manner which establishes laminar flow characteristics within the intake passage.

4. An exhaust gas recirculation system as defined in claim 1, wherein the collector has a longitudinal axis which is essentially perpendicular to the essentially parallel branch pipes and wherein the intake passage is connected to the collector and is essentially coaxially aligned with the longitudinal axis of the collector.

5. An the exhaust gas recirculation system as defined in claim 1, wherein the exhaust gas inlet comprises an exhaust gas conduit extending tangentially with respect to the circular cross-section of the intake passage.

6. An exhaust gas recirculation system as defined in claim 1, wherein the second inlet is located at an essentially 180-degree interval from the first inlet.

7. An exhaust gas recirculation system as defined in claim 6, wherein the first inlet comprises a first exhaust gas conduit connected to the intake passage via said first opening, and wherein the second inlet comprises a second exhaust gas conduit connected to the intake passage via said second opening.

8. An exhaust recirculation system as defined in claim 7, wherein the second exhaust gas conduit is further connected to the intake passage via plural throughholes.

9. An exhaust recirculation system as defined in claim 8, wherein the first exhaust gas conduit is further connected to the intake passage via a throughhole.

10. An exhaust gas recirculation system for a multi-cylinder internal combustion engine, wherein intake air aspirated to a collector from an intake passage of circular cross-section is supplied to cylinders via branch pipes connected to the collector, and a portion of exhaust gas produced by the engine is recirculated to the intake passage from an exhaust passage, comprising:

an exhaust recirculation pipe which branches off from the exhaust passage and is connected to the intake passage; and an exhaust gas inlet which leads recirculated exhaust gas from the exhaust recirculation pipe into the intake passage along a line which is tangential with respect to the circular cross-section of the intake passage and such that exhaust gas merges with air which is flowing axially along the intake passage;

wherein the exhaust gas inlet comprises a first inlet and a second inlet, the second inlet being located at an essentially 180-degree interval from the first inlet;

wherein the first inlet comprises a first exhaust gas conduit connected to the intake passage via a first opening, and the second inlet comprises a second exhaust gas conduit connected to the intake passage via a second opening; and wherein the exhaust gas recirculation system further comprises a single flange connecting the first exhaust gas conduit and second exhaust gas conduit to the exhaust recirculation pipe.

11. An exhaust gas recirculation system for a multi-cylinder internal combustion engine, wherein intake air aspirated to a collector from an intake passage of circular cross-section is supplied to cylinders via branch pipes connected to the collector, and a portion of exhaust gas produced by the engine is recirculated to the intake passage from an exhaust passage, comprising:

an exhaust recirculation pipe which branches off from the exhaust passage and is connected to the intake passage; and an exhaust gas inlet which leads recirculated exhaust gas from the exhaust recirculation pipe into the intake passage along a line which is tangential with respect to the circular cross-section of the intake passage and such that exhaust gas merges with air which is flowing axially along the intake passage;

wherein the exhaust gas inlet comprises a first inlet and a second inlet, the second inlet being located at an essentially 180-degree interval from the first inlet;

wherein the first inlet comprises a first exhaust gas conduit connected to the intake passage via a first opening, and the second inlet comprises a second exhaust gas conduit connected to the intake passage via a second opening; and wherein the second exhaust gas conduit is formed along an outer circumference of the intake passage and has a longer flowpath than the first exhaust gas conduit.

12. An exhaust gas recirculation system as defined in claim 11, wherein the first exhaust gas conduit and second exhaust gas conduit are formed together with the intake passage by casting.

13. An exhaust gas recirculation system as defined in claim 11, wherein the first opening and second opening are elliptically shaped and which each have a long axis essentially parallel to a direction of flow of intake air in the intake passage.

14. An exhaust gas recirculation system as defined in claim 13, wherein a cross-sectional area of the second exhaust gas conduit is set to be larger than a cross-sectional area of the first exhaust gas conduit.

15. An exhaust gas recirculation system as defined in claim 13, wherein the cross-sectional area of the first exhaust gas conduit gradually decreases toward the first opening, and the cross-sectional area of the second exhaust gas conduit gradually decreases toward the second opening.

16. An exhaust gas recirculation system for a multi-cylinder internal combustion engine, wherein intake air aspirated to a collector from an intake passage of circular cross-section is supplied to cylinders via branch pipes connected to the collector, and a portion of exhaust gas produced by the engine is recirculated to the intake passage from an exhaust passage, comprising:

an exhaust recirculation pipe which branches off from the exhaust passage and is connected to the intake passage; and an exhaust gas inlet which leads recirculated exhaust gas from the exhaust recirculation pipe into the intake passage along a line which is tangential with respect to the circular cross-section of the intake passage and such that exhaust gas merges with air which is flowing axially along the intake passage;

wherein the exhaust gas inlet comprises a first inlet and a second inlet, the second inlet being located at an essentially 180-degree interval from the first inlet;

wherein the first inlet comprises a first exhaust gas conduit connected to the intake passage via a first opening, and the second inlet comprises a second exhaust gas conduit connected to the intake passage via a second opening; and wherein the intake passage comprises a first rib projecting into the intake passage upstream of the first opening, and a second rib projecting towards the center of the intake passage upstream of the second opening.

17. An exhaust gas recirculation system as defined in claim 16, wherein the first opening is elliptical shaped and has a first long axis essentially parallel to a direction of flow of the intake air in the intake passage and a first short axis which is perpendicular thereto, wherein the second opening is elliptically shaped and has a second long axis essentially parallel to the direction of flow of intake air in the intake passage and a second short axis which is perpendicular thereto, and wherein the first rib has a height equal to the first short axis, and the second rib has a height equal to the second short axis.

18. An exhaust gas recirculation system as defined in claim 16, wherein the first rib and second rib extend in a circumferential direction on an inner circumference of the intake passage.

* * * * *